(12) United States Patent
Frohlich et al.

(10) Patent No.: US 8,046,674 B2
(45) Date of Patent: Oct. 25, 2011

(54) INTERNET BROWSING SYSTEM

(75) Inventors: David Mark Frohlich, Westbury-on-Trym Bristol (GB); David Arthur Grosvenor, South Gloucestershire Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2036 days.

(21) Appl. No.: 10/476,449

(22) PCT Filed: Oct. 30, 2002

(86) PCT No.: PCT/GB02/04883
§ 371 (c)(1),
(2), (4) Date: May 13, 2004

(87) PCT Pub. No.: WO03/038668
PCT Pub. Date: May 8, 2003

(65) Prior Publication Data
US 2005/0021673 A1    Jan. 27, 2005

(30) Foreign Application Priority Data
Oct. 31, 2001   (GB) .................................. 0126207.0

(51) Int. Cl.
*G06F 17/00* (2006.01)

(52) U.S. Cl. ...................... 715/205; 715/200

(58) Field of Classification Search .................. 709/218; 715/501, 513, 500, 200, 201, 205, 206, 207, 715/208, 209, 210, 700
See application file for complete search history.

(56) References Cited

U.S. PATENT DOCUMENTS

| | | | |
|---|---|---|---|
| 5,781,914 A | 7/1998 | Stork et al. | |
| 5,903,729 A | 5/1999 | Reber et al. | |
| 6,115,482 A | 9/2000 | Sears et al. | |
| 6,289,304 B1 * | 9/2001 | Grefenstette | 704/9 |
| 6,311,214 B1 | 10/2001 | Rhoads | |
| 6,537,324 B1 * | 3/2003 | Tabata et al. | 715/205 |
| 2001/0033293 A1 * | 10/2001 | Hollstrom et al. | 345/705 |

(Continued)

FOREIGN PATENT DOCUMENTS

EP    0 952 533 A2    10/1999
(Continued)

OTHER PUBLICATIONS

Robinson, "Digital manuscripts and electronic publishing," *Online*! Mar. 1998, pp. 2-6, University of Cambridge Computer Laboratory.

(Continued)

*Primary Examiner* — David Ometz
*Assistant Examiner* — Peter Chon

(57) ABSTRACT

An apparatus for Internet browsing and other Internet-interactive activities, comprises: a camera focusing on a printed hypertext document for generating video signals representing an image of the printed hypertext document in electronic form: A processor linked to the camera processes images of the printed hypertext document captured by the camera and a finger or other pointing implement within the camera field of view pointing to a region of the printed hypertext document and determines from the image the identity of a linked web page or a linked multi-media, i.e. audio and/or video sequence, data file referred to on that hypertext document in the region pointed to, and then fetches from the Internet or a local cache of web pages data comprising the linked web page or linked multimedia data file referenced in the printed hypertext document. A receiver receives and displays or plays the fetched data.

21 Claims, 5 Drawing Sheets

U.S. PATENT DOCUMENTS

2002/0118181 A1* 8/2002 Sekendur .................. 345/179

FOREIGN PATENT DOCUMENTS

| | | |
|---|---|---|
| EP | 1 085 431 A2 | 3/2001 |
| JP | 2000010984 A | 1/2000 |

OTHER PUBLICATIONS

Müller et al., "Augmenting Paper Documents with Digital Information in a Mobile Environment," *Online!*, Sep. 3, 1996, 44 pp., Universität Dortmund.

* cited by examiner

INTERNET BROWSING SYSTEM

FIELD OF THE INVENTION

The present invention relates to a method and apparatus to facilitate browsing and interaction with the Internet.

BACKGROUND TO THE INVENTION

Browsing the web is a frustrating experience for many PC/computer users, and is off-putting to those who are unfamiliar with the desktop computing paradigm. Control actions performed with a mouse, keyboard and the conventional Graphical User Interface require considerable manual dexterity, typing skills and a complex cognitive user model. Furthermore, detailed reading and browsing is difficult and tiring on a general purpose computer screen.

One approach to this problem is to design specialised web tablets, PDAs or e-books whose screens are optimised for the presentation and manipulation of both textual and hypertextual material. However, these devices are expensive and still have ease of use problems associated with the performance of control actions and text input on what is essentially an unfamiliar medium. Another approach is to use voice interaction, such as that which might be supported over a telephone link to an Internet browser. This might be effective for certain types of specific information queries, but is unsuitable for less goal-directed browsing of information.

It is a general objective of the present invention to provide a method and apparatus to facilitate activities such as Internet browsing and which mitigates or addresses some or all of the above-noted problems of the prior art.

SUMMARY OF THE INVENTION

According to a first aspect of the present invention there is provided an apparatus for Internet browsing and other Internet-interactive activities, which apparatus comprises: a camera to focus on to a printed hypertext document for generating video signals representing an image of the printed hypertext document in electronic form; a processor linked to the camera for processing an image captured by the camera of the printed hypertext document and of a finger or other pointing implement within the field of view of the camera pointing to a region of the printed hypertext document and configured to determine from the image the identity of a linked web page or a linked multi-media, i.e. audio and/or video sequence, data file referred to on that hypertext document in the region pointed to, and to then fetch from the Internet or a local cache of web pages data that comprises the linked web page or linked multimedia data file referenced in the printed hypertext document; and a receiver for receiving and displaying or playing the fetched data.

The apparatus preferably further comprises a said printed hypertext document and which is positioned within the field of view of the camera. The printed hypertext document is suitably a printed web page.

To have extensive utility, the processor of the apparatus is particularly preferably configured to identify the printed hypertext document.

The printed hypertext document is preferably, and suitably at time of printing, marked with an identifying symbol or code. In the case that the printed hypertext document is a printed web page the symbol or code is additional to any identifier (e.g. the URL) already present in the information comprising the web page. The symbol or code is preferably readily machine readable and may comprise a bar code or dataglyph, and suitably a two-dimensional bar code.

Such an identifying symbol or code facilitates rapid and reliable recognition of the printed hypertext document by the processor. On establishing the identity of the printed hypertext document the processor is able to obtain information concerning the content of the printed hypertext document from a memory, internal or external, and may do so, for example, by fetching a web page from the internet, where the hypertext document is a web page.

Preferably the processor holds in a local memory pre-stored information concerning the content of the printed hypertext document.

Preferably the memory or a further memory holds the respective identifying symbol of each printed page linked to the URL of that page. The identifying symbol or code is preferably machine readable, and suitably is a bar code.

Preferably the memory holds a reference version of the or each printed hypertext document that the user has printed out. This may serve as an ideal page onto which the image from the camera is mapped by the processor and which the processor may then use to recognise which region of the printed hypertext document and its associated hyperlink is pointed to by the finger or pointing implement and selected by the user. The ideal page need not, however, be a fully detailed version of the printed hypertext document but may comprise an outline of the page. The apparatus stores a 2-D hit detection table for determining if a hyperlink has been selected. This is suitably as used in conventional browsers and allocates an area of the page as being mapped to a particular hyperlink or not.

In absence of an identifying symbol or code the processor may alternatively be configured to recognise the printed hypertext document by recognition of the pattern of the text and/or drawings of the document. Optical Character Recognition (OCR) is another basis on which page identification may be carried out.

Particularly preferably the printed hypertext document is marked with distinctive calibration marks and which are suitably located proximate different respective extremities of the document. The processor is preferably configured to recognise the distinctive calibration marks on the printed hypertext documents to facilitate determination of the pose of the printed hypertext document with respect to the camera and facilitate registration of the camera view of the printed hypertext document on to an ideal page.

The apparatus of the present invention preferably comprises a pointing implement, which may suitably be generally in the form of a pen, that has an associated selector and is operatively linked to the processor to enable the user to designate to the processor when the pointing implement is pointing to the desired hyperlink region of the printed hypertext document. The selector is preferably a button on the implement and may suitably be provided at the tip of the implement.

Particularly preferably the selector provides a signal confirmatory of when a selection is made. Unlike a conventional screen-based web-browser, the apparatus does not have the facility to highlight the selected hyperlink on-screen but suitably gives an auditory signal e.g. such as a clicking noise. Where a pen-shaped implement is used, for example, this may conveniently have a click-button at its upper end.

According to a further aspect of the present invention there is provided a printed page representing a hypertext document, comprising: hypertext content; and calibration marks on the printed page to facilitate determination of the pose of the document with respect to a camera.

According to a yet further aspect of the present invention there is provided a method of printing a hypertext document, comprising: obtaining hypertext content to be printed; for each page to be printed, disposing calibration marks about the hypertext content to facilitate determination of the orientation of the document with respect to a camera; and printing the hypertext document.

According to a yet further aspect of the present invention there is provided an apparatus for Internet browsing and other Internet-interactive activities, which apparatus comprises: a camera to focus on to a printed hypertext document for generating video signals representing an image of the printed hypertext document in electronic form; a processor linked to the camera for processing an image captured by the camera of the printed hypertext document and of a finger or other pointing implement within the field of view of the camera pointing to a region of the printed hypertext document, the processor holding in a memory pre-stored information concerning the content of the printed hypertext document and being configured to determine from the image and the pre-stored information the identity of a linked web page or a linked multi-media data file referred to on that hypertext document in the region pointed to, and to then fetch from the Internet or a local cache of web pages data that comprises the linked web page or linked multimedia data file referenced in the printed hypertext document; and a receiver for receiving and displaying or playing the fetched data.

According to a yet further aspect of the present invention there is provided a processor configured to process an image captured by a camera of a printed hypertext document and of a finger or other pointing implement within the field of view of the camera pointing to a region of the printed hypertext document, the processor holding in a memory pre-stored information concerning the content of the printed hypertext document and being configured to determine from the image and the pre-stored information the identity of a linked web page or a linked multi-media data file referred to on that hypertext document in the region pointed to, and to then fetch from the Internet or a local cache of web pages data that comprises the linked web page or linked multimedia data file referenced in the printed hypertext document.

According to a yet further aspect of the present invention there is provided a computer program for directing a processor to process an image captured by a camera of a printed hypertext document and of a finger or other pointing implement within the field of view of the camera pointing to a region of the printed hypertext document, to determine from the image and the pre-stored information the identity of a linked web page or a linked multi-media data file referred to on that hypertext document in the region pointed to, and to then fetch from the Internet or a local cache of web pages data that comprises the linked web page or linked multimedia data file referenced in the printed hypertext document.

As used herein the terms 'Internet' and 'web' or 'web page' are intended to refer primarily to the world wide web and pages thereof but also to encompass analogous networks/file structures where network pages are accessed by URLs or the equivalent.

BRIEF DESCRIPTION OF THE DRAWINGS

A preferred embodiment of the present invention will now be more particularly described, by way of example, with reference to the accompanying drawings, wherein.

DESCRIPTION OF THE PREFERRED EMBODIMENT

Figure 1:
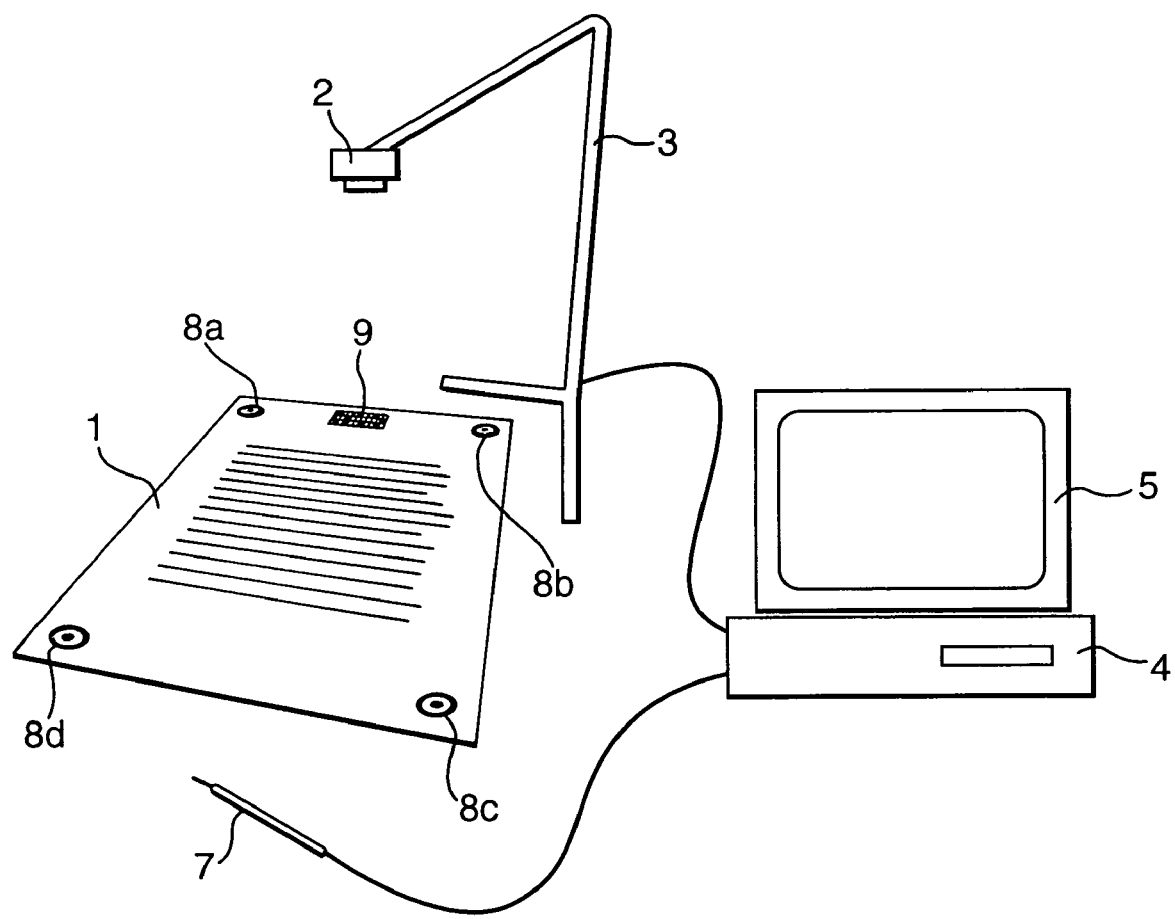
FIG. 1 is a simple system architecture diagram.

Referring firstly to FIG. 1, this illustrates an embodiment of the system of the present invention, as set up for operation. The system/apparatus comprises, in combination; a printed hypertext document comprising a printed web page 1; a camera 2 that may suitably be a digital video camera or scanner and that is held above the printed web page 1 by a stand 3 and focuses down on the web page 1; a processor/computer 4 to which the camera 2 is linked, the computer 4 suitably being a conventional PC having an associated VDU/monitor 6; and a pointer 7 with a pressure sensitive tip or selector button and which is linked to the computer 4.

The printed web page 1 differs from a conventional printed web page in that it bears a set of four calibration marks 8a-8d, one mark 8a-d proximate each corner of the page, in addition to a two-dimensional bar code which serves as a readily machine-readable page identifier mark 9 and which is located at the top of the page 1 substantially centrally between the top edge pair of calibration marks 8a, 8b.

The calibration marks 8a-8d are widely spaced apart and prominently visible position reference marks that are designed to be easily differentiable and localisable by the processor of the computer 4 in the electronic images of the web page 1 captured by the overhead camera 2.

Figure 3:
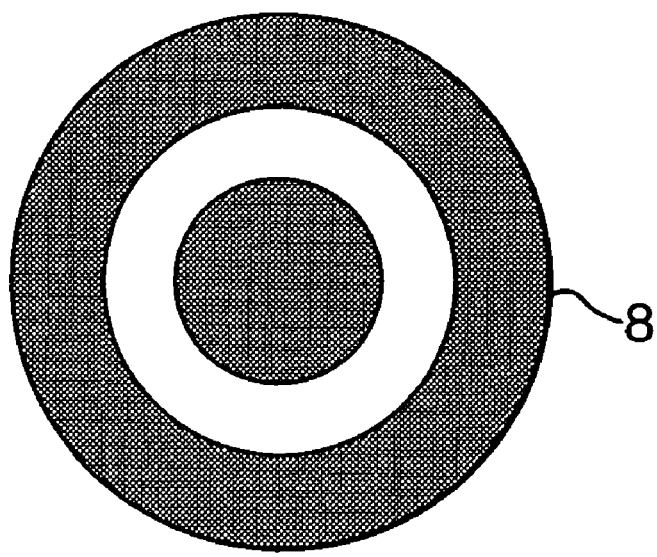
FIG. 3 is a close-up plan view of one of the calibration marks.
Figure 4:
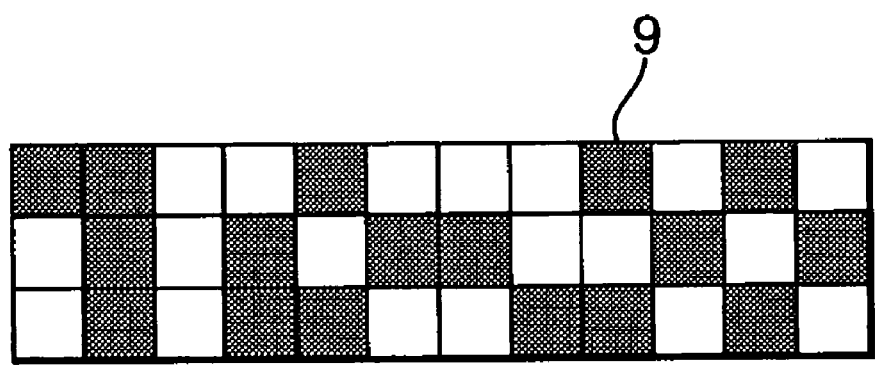
FIG. 4 is a close-up plan view of the page identification mark comprising a two-dimensional bar code.

The illustrated four calibration marks positioned 8a-8d proximate respective corners of the page 1 are simple and robust, each comprising a black circle on a white background with an additional black circle around it as shown in FIG. 3. This gives three image regions that share a common centre (central black disc with outer white and black rings). This relationship is approximately preserved under moderate perspective projection as is the case when the target is viewed obliquely.

It is easy to robustly locate such a mark 8 in the image taken from the camera 2. The black and white regions are made explicit by thresholding the image using either a global or preferably a locally adaptive thresholding technique. Examples of such techniques are described in:

Gonzalez R. & Woods R. Digital Image Processing, Addison-Wesley, 1992, pages 443-455; and Rosenfeld A. & Kak A. Digital Picture Processing (second edition), Volume 2, Academic Press, 1982, pages 61-73.

After thresholding, the pixels that make up each connected black or white region in the image are made explicit using a component labelling technique. Methods for performing connected component labelling/analysis both recursively and serially on a raster by raster basis are described in: Jain R., Kasturi R. & Schunk B. Machine Vision, McGraw-Hill, 1995, pages 42-47 and Rosenfeld A. & Kak A. Digital Picture Processing (second edition), Volume 2, Academic Press, 1982, pages 240-250.

Such methods explicitly replace each component pixel with a unique label.

Black components and white components can be found through separate applications of a simple component labelling technique. Alternatively it is possible to identify both black and white components independently in a single pass through the image. It is also possible to identify components implicitly as they evolve on a raster by raster basis keeping only statistics associated with the pixels of the individual connected components (this requires extra storage to manage the labelling of each component).

In either case what is finally required is the centre of gravity of the pixels that make up each component and statistics on its horizontal and vertical extent. Components that are either too large or too small can be eliminated straight off. Of the remainder what we require are those which approximately share the same centre of gravity and for which the ratio of their horizontal and vertical dimensions agrees roughly with those in the calibration mark 8. An appropriate black, white, black combination of components identifies a calibration mark 8 in the image. Their combined centre of gravity (weighted by the number of pixels in each component) gives the final location of the calibration mark 8.

Figure 2:
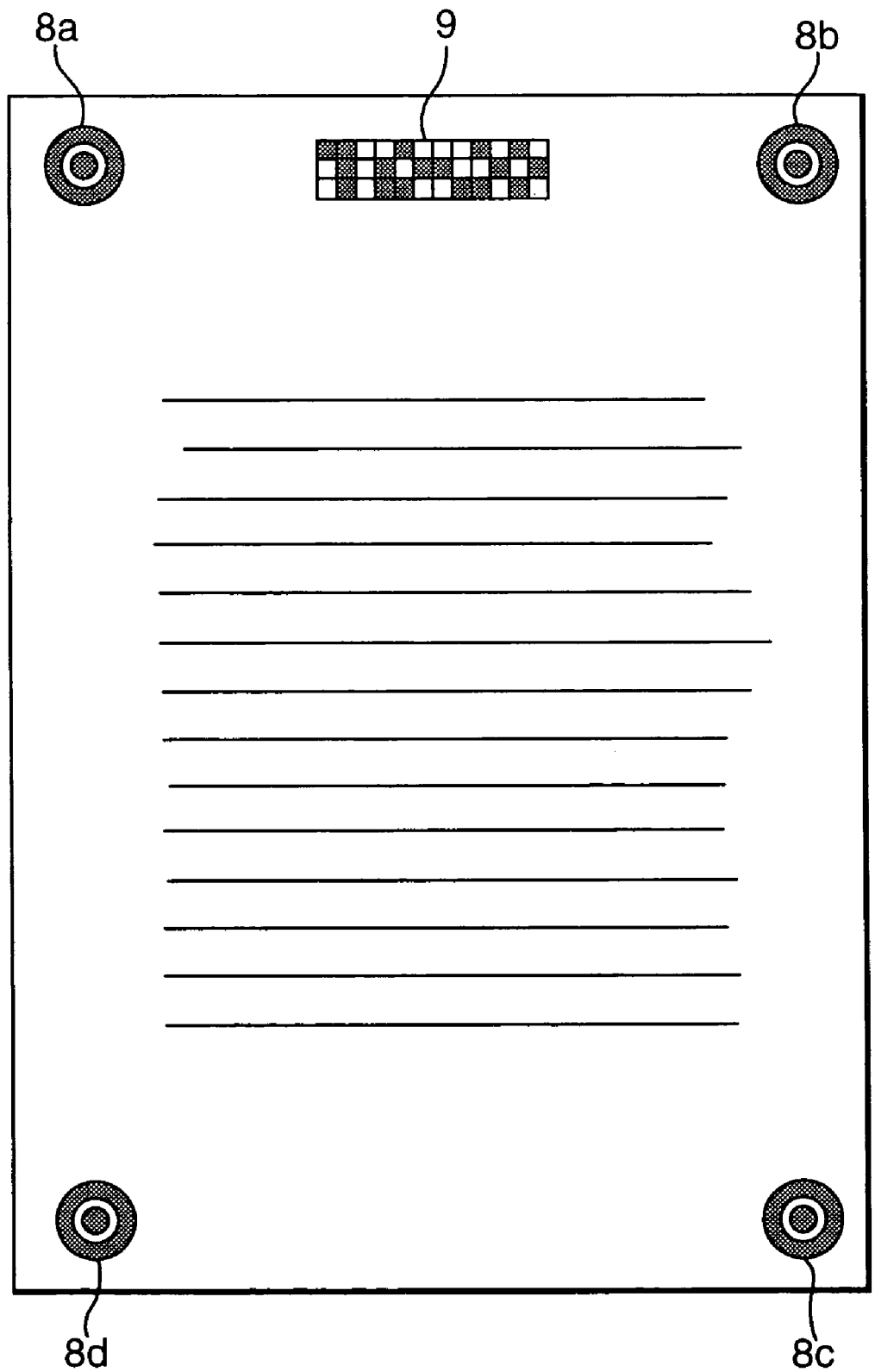
FIG. 2 is a plan view of a printed paper hypertext document (web-page) with calibration marks and a page identification mark.

The minimum physical size of the calibration mark 8 depends upon the resolution of the sensor/camera 2. Typically the whole calibration mark 8 must be more than about 60 pixels in diameter. For a 3MP camera 2 imaging an A4 document there are about 180 pixels to the inch so a 60 pixel target would cover $\frac{1}{3}^{rd}$ of an inch. It is particularly convenient to arrange four such calibration marks 8a-d at the corners of the page to form a rectangle as shown in the illustrated embodiment FIG. 2.

For the simple case of fronto-parallel (perpendicular) viewing it is only necessary to correctly identify two calibration Marks 8 in order to determine the location, orientation and scale of the documents. Furthermore for a camera 2 with a fixed viewing distance the scale of the document 1 is also fixed (in practice the thickness of the document, or pile of documents, affects the viewing distance and, therefore, the scale of the document).

In the general case the position of two known calibration marks 8 in the image is used to compute a transformation from image co-ordinates to those of the web page document 1 (e.g. origin at the top left hand corner with the x and y axes aligned with the short and long sides of the document respectively). The transformation is of the form:

$$\begin{bmatrix} X' \\ Y' \\ 1 \end{bmatrix} = \begin{bmatrix} k\cos\theta & -\sin\theta & t_x \\ \sin\theta & k\cos\theta & t_y \\ 0 & 0 & 1 \end{bmatrix} \begin{bmatrix} X \\ Y \\ 1 \end{bmatrix}$$

Where (X, Y) is a point in the image and (X', Y') is the corresponding location on the web page document 1 with respect to the document page co-ordinate system. For these simple 2D displacements the transform has three components: an angle θ a translation ($t_x$, $t_y$) and a overall scale factor k. These can be computed from two matched points and the imaginary line between them using standard techniques (see for example: HYPER: A New Approach for the Recognition and Positioning of Two-Dimensional Objects, IEEE Trans. Pattern Analysis and Machine Intelligence, Volume 8, No. 1, January 1986, pages 44-54).

With just two identical calibration marks 8a, 8b it may be difficult to determine whether they lie on the left or right of the document or the top and bottom of a rotated document 1 (or in fact at opposite diagonal corners). One solution is to use non-identical marks 8, for example, with different numbers of rings and/or opposite polarities (black and white ring order). This way any two marks 8 can be identified uniquely.

Alternatively a third mark 8c can be used to disambiguate. Three marks 8a-c must form an L-shape with the aspect ratio of the document 1. Only a 180 degree ambiguity then exists for which the document 1 would be inverted for the user and thus highly unlikely to arise.

Where the viewing direction is oblique (allowing the document 1 surface to be non-fronto-parallel or extra design freedom in the camera 2 rig) it is necessary to identify all four marks 8a-8d in order to compute a transformation between the viewed image co-ordinates and the document 1 page co-ordinates.

The perspective projection of the planar document 1 page into the image undergoes the following transformation:

$$\begin{bmatrix} x \\ y \\ w \end{bmatrix} = \begin{bmatrix} a & b & c \\ b & e & f \\ g & h & 1 \end{bmatrix} \begin{bmatrix} X \\ Y \\ 1 \end{bmatrix}$$

Where X'=x/w and Y'=y/w.

Once the transformation has been computed then it can be used to locate the document page identifier bar code 9 from the expected co-ordinates for its location as held in a memory in or linked to the computer 4. Also the computed transformation enables mapping of pointing actions in the image to hyperlinks on the page (in its electronic form).

Figure 5:
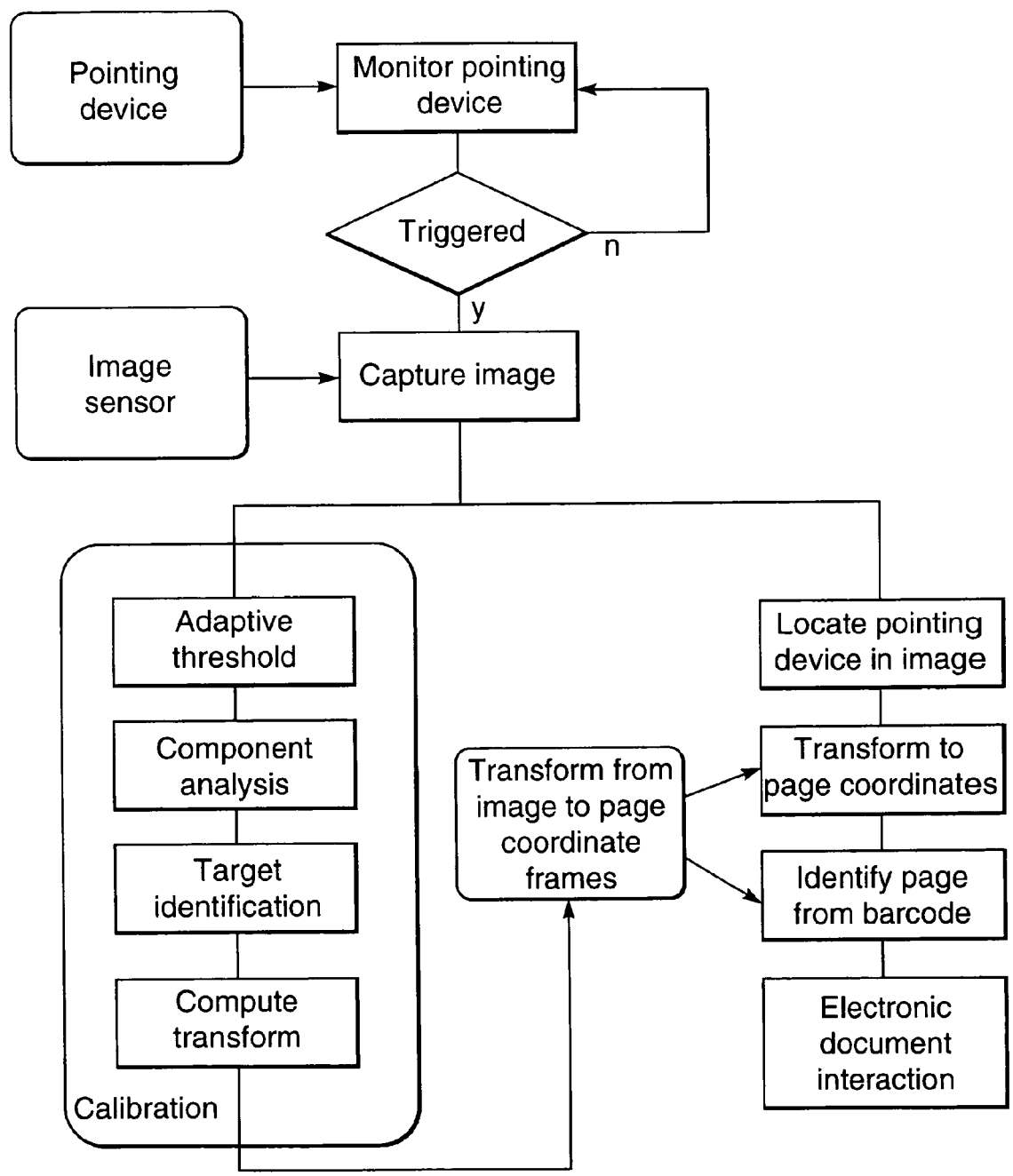
FIG. 5 is a flow chart demonstrating the operation of the system.

The flow chart of FIG. 5 shows a sequence of actions that are suitably carried out in using the system and which is initiated by triggering a switch associated with the pointing device 7 for pointing at the web page 1 within the field of view of the image sensor/camera 2. The triggering causes capture of an image from the camera 2, which is then processed by the computer 4

As noted above, in the embodiment of FIG. 1 the apparatus comprises a tethered pen-shaped pointer 7 with a pressure sensor or selector button at its tip that may be used to trigger capture of an image by the camera 2 when the document 1 is tapped with the pointer tip 7. This image is used for calibration to calculate the mapping from image to page co-ordinates; for page identification from the barcodes; and to identify the current location of the end of the pointer 7.

The calibration and page identification operations are best performed by the processor/computer in advance of mapping any pointing actions with the pointer 7 in order to reduce system delay.

The easiest way to identify the tip of the pointer 7 is to use a readily differentiated locatable and identifiable special marker at the tip. However, other automatic methods for recognising long pointed objects are to workable. Indeed, pointing may be done using the operator's finger provided that the system is adapted to recognise it and its tip and to respond to a signal such as tapping or other distinctive movement (e.g. circling) of the finger or operation of a separate switch to trigger image capture when the tip of the pointing finger is pointing to the desired area of the printed web page 1.

Interaction with the Internet

As described above, the computer 4 is programmed to recognise a gesture pointing to a region of the printed web page 1, with trigger activated selection, as a trigger to carry out operations that would otherwise be carried out by a standard screen-based web browser. The system may also be used for simple "book-marking" browsing actions without need for pointing.

In one embodiment the user may build up an image database of every web page 1 that he chooses to print out, together with its associated URL, the computer 4 being programmed to support image recognition from the general pattern or layout of any of those printed web pages 1 in order to trigger fetching of, and if desired, on-screen re-display of, the original web page. The image database is suitably held in a memory in or linked to the computer 4.

Generally more economically, but less swift-operating in use, the computer may be programmed to carry out OCR on the content of a printed web page 1 in order to directly recover and use the URL from the printed web page 1 to fetch the original web page from its web site on the Internet using the range of different means available for communicating with website providers on the Internet and re-display the page on the screen 6. An OCR-based approach may also be used to recover the URL or other identifier from the printed web page 1 and use it to locate and fetch the corresponding web page from a local cache of web pages without needing to connect anew to the Internet.

As discussed earlier with respect to the illustrated embodiment, each printed web page 1 is suitably printed with a special visible barcode identity tag 9 to facilitate rapid recognition of the web page 1 by the computer 4 from the tag 9. The special identity tag 9 is suitably printed onto the web page 1 at the time of printing the page 1. The editor that formats the web page for printing out is suitably adapted to incorporate the identity tag 9 into the printed page 1, placing it at a convenient standardised location, suitably at the top centre, as illustrated, beyond the margin of the original information content of the web page.

Printing of a web page 1 of this type could be done through a special application, or more logically as an option within a web browser. Once the document is selected for printing in this format, the editor within the printing application configures both the set of calibration marks and the identity tag on each page to be printed—this will most practically be within margins forming a frame around the document content. Once the document has been configured in this way, it can be printed in an entirely conventional manner.

Figure 6:
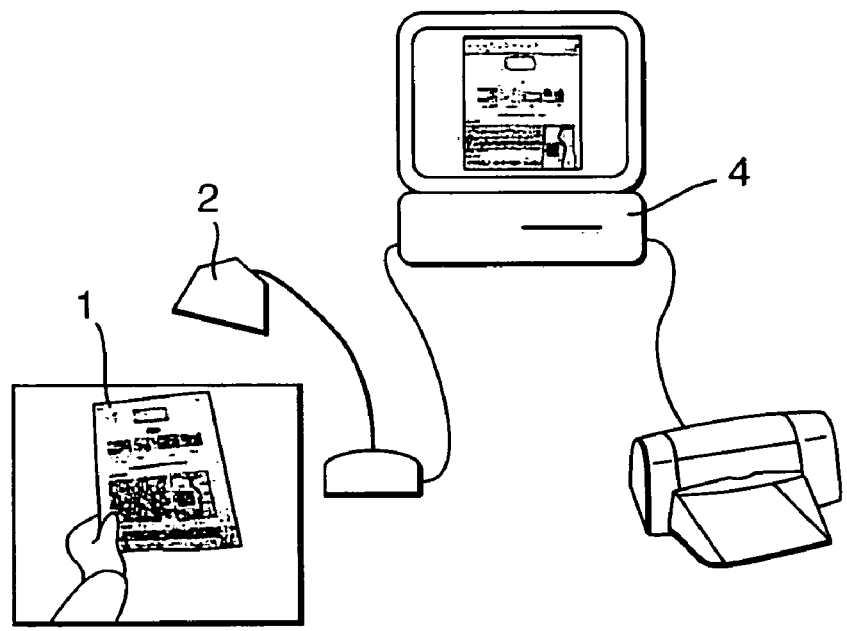
FIG. 6 is a view similar to FIG. 1 and demonstrating use of the browsing system simply for "bookmarking"

In the simple application of browsing using the system, illustrated in FIG. 6, the user can, simply by placing the web page 1 face up under the camera 2 and triggering image capture, use the printed web page 1 as a physical bookmark for that page's automatic fetching and display on the screen. This convenient functionality encourages the printing out of web content for casual browsing or careful reading and marking, whilst allowing users to quickly return to the on-line web page for further searching or cross-references.

Figure 7:
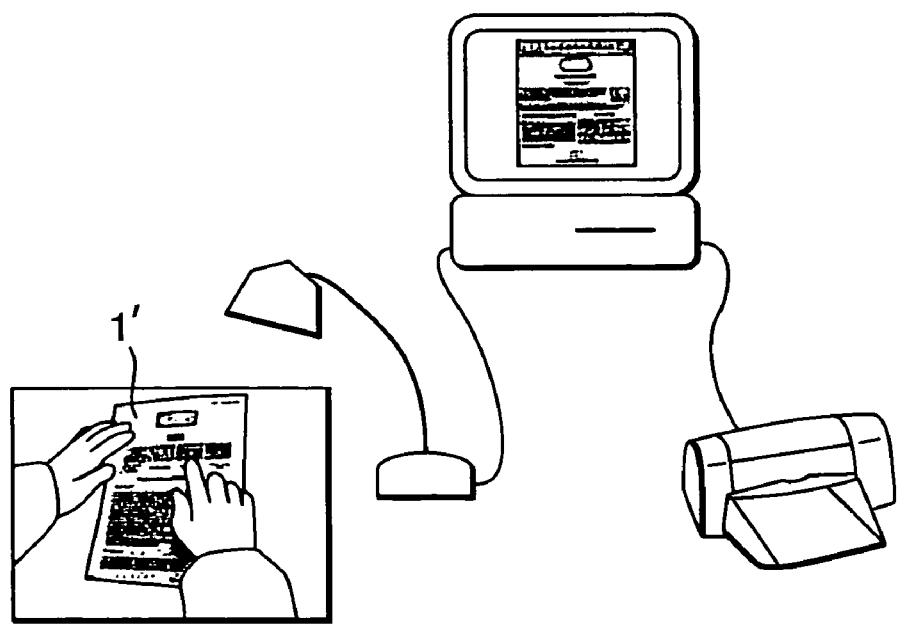
FIG. 7 is a view similar to FIG. 1, demonstrating use of the browsing system for "hot-linking" to another web page.

In its primary mode of use, the browsing system, as shown in FIG. 7, serves to access the cross-referenced pages that are supported as hot-links/hyper-links on a screen-displayed web page. This requires the use of the further image processing procedure to identify and interpret pointing gestures on the printed web page 1 and to map each pointing gesture to the associated hot link area on the original web page. Following the scheme of operation in the flowchart of FIG. 5, the pointing device 7 is pointed within the field of view of the camera/image sensor 2 to a position on the printed web page 1 that corresponds to a hot link. The user triggers selection of image capture by pressing/tapping the button or pressure sensor of the tip of the pointing device 7 against the selected point on the page 1. The processor/computer 4 then uses the captured image for calibration to bring the camera view of the page into register with an ideal page, identifying the page from its bar code (if one has been used). The processor 4 also locates the pointing device 7 in the captured image and determines the position of the pointing device 7 with respect to the ideal page. A 2-D hit detection table stored in the processor 4 then identifies to the processor 4 which hyperlink, if any, corresponds to the position designated by the pointing device 7 and operates the subroutine to fetch the web page that is linked to by the hyperlink.

The effect from the user's perspective is that by pointing to a highlighted area he/she will see the associated page come up on the screen 6 of the computer 4. This is particularly useful for a printed home page or series of printed home pages containing multiple hot links in index form. The printed index page 1' may act not only as a convenient mechanism by which to 'browse' the associated web pages, but also as a summary and reminder of the information which could be integrated into other paper notes and files. A further major advantage of this approach over screen-based browsing is that a second 'screen' comes free: allowing the index or home page to remain in view (on paper) whilst associated pages are displayed on the computer screen 6.

The functionality for display of linked pages by pointing to highlighted areas on a printed web page 1 may also be readily adapted to effect playback of associated audio or video information. Audio playback has the additional advantage of allowing the user's attention to remain on the printed page whilst listening and video playback may be full screen since playback control can still be exerted from the printed page, for example by pointing to a region of the printed document. Whilst this works for any kind of multimedia web content it is, for example, particularly suitable for interaction with multimedia photo websites supporting both audio and video attachments to still images (e.g. www.dotphoto.com). In this situation users can arrange audiophotos and index shots for video snippets into a screen displayed album before printing the pages for entry into a physical photo album. They may then play back any associated audio or video clips on the computer 4 by pointing to the index photos in the album. In this scenario each photo region acts as a hot link to its corresponding audio-visual material.

As a further refinement to the system, handwriting recognition software may be programmed into the computer processor 4 to enable web searching and form-filling from the printed page 1. Handwriting recognition software itself is well known and appropriate conventional software can be used for this purpose. A printed web page 1 may, for example, contain an order form for completion by a user, and the user could complete the form by writing on the printed web page, perhaps completing in addition a "submission" box to indicate that the form should be uploaded, or alternatively by selecting a submission area with pointer 7 and activating a selection button as in previous examples. Using this approach, a user could search for items on the internet, order items or conduct full commercial transactions. Requested content may also usefully be printed is such a form—for example, search results may themselves be printed in booklet form for assisted browsing under the camera 2.

All of the Internet-interactive functionalities described above may be supported on a variety of web-enabled viewing appliances such as laptops, handheld PCs, PDAs, Smart phones, Web TV, Internet screen phones and kiosks, for example.

The invention claimed is:

1. An apparatus for Internet browsing and other Internet-interactive activities, which apparatus comprises:
   a camera to focus on to a printed hypertext document for generating video signals representing an image of the printed hypertext document in electronic form;

a processor linked to the camera for processing an image captured by the camera of the printed hypertext document and of a pointer within the field of view of the camera pointing to a region of the printed hypertext document and configured to determine from the image the identity of a linked web page or a linked multi-media data file referred to on the hypertext document in the region pointed to, and to then fetch from the Internet or a local cache of web pages data that comprises the linked web page or linked multimedia data file referenced in the printed hypertext document; and a receiver for receiving and displaying or playing the fetched data, wherein the image captured by the camera includes the printed hypertext document and the pointer, the pointer not being a part of the printed hypertext document, wherein the pointer points to the region of the printed hypertext document without writing on the printed hypertext document, wherein the processor is to determine the identity of the linked web page or the linked multi-media data file referred to on the hypertext document in the region pointed to by determining where the pointer points to within the image captured by the camera, wherein the pointer is one of a finger of a user and a pointing implement other than a finger of the user, wherein where the pointer is a finger of the user, the processor is to detect the finger of the user within the image captured by the camera responsive to the user performing a predetermined movement of the finger, and wherein where the pointer is a pointing implement, the processor is to detect the pointer by detecting a readily differentiated, locatable, and identifiable marker at a tip of the pointing implement within the image captured by the camera, wherein the processor is to detect a first calibration mark printed on the printed hypertext document, a second calibration mark printed on the printed hypertext document, and a third calibration mark printed on the printed hypertext document to determine a location, orientation, and scale of the printed hypertext document, where the first calibration mark, the second calibration mark, and the third calibration mark are identical to one another and form an L-shape with respect to an aspect ratio of the printed hypertext document.

2. An apparatus as claimed in claim 1 and which further comprises a printed hypertext document positioned within the field of view of the camera.

3. An apparatus as claimed in claim 2, wherein the processor holds in a memory pre-stored information concerning the content of the printed hypertext document.

4. An apparatus as claimed in claim 3, wherein the memory holds a pre-stored reference version of the printed hypertext document.

5. An apparatus as claimed in claim 1, wherein the printed hypertext document is a printed web page and is marked with an identifying symbol or code additional to any web page identifier that is already present in the information comprising the web page and which the processor is configured to recognise.

6. An apparatus as claimed in claim 1, wherein the processor is configured to identify the printed hypertext document by use of Optical Character Recognition or pattern recognition.

7. An apparatus as claimed in claim 1, wherein the processor is configured to recognise calibration marks on the printed hypertext document to facilitate determination of the pose of the document with respect to the camera.

8. An apparatus as claimed in claim 1, wherein the apparatus stores a 2-D hit detection table for determining if a hyperlink has been selected.

9. The apparatus of claim 1, wherein the processor is to detect a first calibration mark printed on the printed hypertext document and a second calibration mark printed on the printed hypertext document to determine a location, orientation, and scale of the printed hypertext document, where the first calibration mark is not identical to the second calibration mark.

10. An apparatus for Internet browsing and other Internet-interactive activities in response to a printed web page, which apparatus comprises:

a camera to focus on to the printed web page for generating video signals representing an image of the web page in electronic form;

a processor linked to the camera for processing an image of the printed web page captured by the camera and to determine from the image one or more of: the identity of another web page referred to on the printed web page; and the identity of a linked multi-media data file that is referenced in the printed web page, and to then fetch from the Internet the web page referenced in the printed web page or the linked multi-media data file that is linked to by the printed web page; and a receiver for receiving and displaying or playing the fetched data, wherein the image is captured by the camera and includes the printed hypertext document and a pointer not part of the printed hypertext document, wherein the pointer points to a region of the printed hypertext document without writing on the printed hypertext document, wherein the processor is to determine the identity of the web page or the linked multi-media data file referred to on the hypertext document in the region pointed to by determining where the pointer points to within the image captured by the camera, wherein the pointer is one of a finger of a user and a pointing implement other than a finger of the user, wherein where the pointer is a finger of the user, the processor is to detect the finger of the user within the image captured by the camera responsive to the user performing a predetermined movement of the finger, and wherein where the pointer is a pointing implement, the processor is to detect the pointer by detecting a readily differentiated, locatable, and identifiable marker at a tip of the pointing implement within the image captured by the camera, wherein the processor is to detect a first calibration mark printed on the printed hypertext document, a second calibration mark printed on the printed hypertext document, and a third calibration mark printed on the printed hypertext document to determine a location, orientation, and scale of the printed hypertext document, where the first calibration mark, the second calibration mark, and the third calibration mark are identical to one another and form an L-shape with respect to an aspect ratio of the printed hypertext document.

11. The apparatus of claim 10, wherein the processor is to detect just a first calibration mark printed on the printed hypertext document and a second calibration mark printed on the printed hypertext document to determine a location, orientation, and scale of the printed hypertext document, where the first calibration mark is not identical to the second calibration mark.

12. An apparatus for Internet browsing and other Internet-interactive activities, which apparatus comprises:
 a camera to focus on to a printed hypertext document for generating video signals representing an image of the printed hypertext document in electronic form;
 a processor linked to the camera for processing an image captured by the camera of the printed hypertext document, the processor holding in a memory pre-stored information concerning the content of the printed hypertext document and being configured to determine from the image a linked web page or a linked multi-media data file referred to on that hypertext document and to then fetch from the Internet or a local cache of web pages data that comprises the linked web page or the linked multi-media data file referenced in the printed hypertext document; and
 a receiver for receiving and displaying or playing the fetched data,
 wherein the image is captured by the camera and includes the printed hypertext document and a pointer not part of the printed hypertext document,
 wherein the pointer points to a region of the printed hypertext document without writing on the printed hypertext document,
 wherein the processor is to determine the identity of the web page or the linked multi-media data file referred to on the hypertext document in the region pointed to by determining where the pointer points to within the image captured by the camera,
 wherein the pointer is one of a finger of a user and a pointing implement other than a finger of the user,
 wherein where the pointer is a finger of the user, the processor is to detect the finger of the user within the image captured by the camera responsive to the user performing a predetermined movement of the finger,
 and wherein where the pointer is a pointing implement, the processor is to detect the pointer by detecting a readily differentiated, locatable, and identifiable marker at a tip of the pointing implement within the image captured by the camera,
 wherein the processor is to detect a first calibration mark printed on the printed hypertext document, a second calibration mark printed on the printed hypertext document, and a third calibration mark printed on the printed hypertext document to determine a location, orientation, and scale of the printed hypertext document, where the first calibration mark, the second calibration mark, and the third calibration mark are identical to one another and form an L-shape with respect to an aspect ratio of the printed hypertext document.

13. An apparatus as claimed in claim 12, wherein the memory holds a URL for the printed hypertext document.

14. An apparatus as claimed in claim 12, wherein the memory holds a reference version of the or each printed hypertext document that the user has printed out.

15. The apparatus of claim 12, wherein the processor is to detect just a first calibration mark printed on the printed hypertext document and a second calibration mark printed on the printed hypertext document to determine a location, orientation, and scale of the printed hypertext document, where the first calibration mark is not identical to the second calibration mark.

16. An apparatus for Internet browsing and other Internet-interactive activities, which apparatus comprises:
 a camera to focus on to a printed hypertext document for generating video signals representing an image of the printed hypertext document in electronic form;
 a processor linked to the camera for processing an image captured by the camera of the printed hypertext document and of a finger or other pointing implement within the field of view of the camera pointing to a region of the printed hypertext document, the processor holding in a memory pre-stored information concerning the content of the printed hypertext document and being configured to determine from the image and the pre-stored information the identity of a linked web page or a linked multi-media data file referred to on that hypertext document in the region pointed to, and to then fetch from the Internet or a local cache of web pages data that comprises the linked web page or linked multimedia data file referenced in the printed hypertext document; and
 a receiver for receiving and displaying or playing the fetched data, wherein the image is captured by the camera and includes the printed hypertext document and a pointer not part of the printed hypertext document,
 wherein the pointer points to a region of the printed hypertext document without writing on the printed hypertext document,
 wherein the processor is to determine the identity of the web page or the linked multi-media data file referred to on the hypertext document in the region pointed to by determining where the pointer points to within the image captured by the camera,
 wherein the pointer is one of a finger of a user and a pointing implement other than a finger of the user,
 wherein where the pointer is a finger of the user, the processor is to detect the finger of the user within the image captured by the camera responsive to the user performing a predetermined movement of the finger,
 and wherein where the pointer is a pointing implement, the processor is to detect the pointer by detecting a readily differentiated, locatable, and identifiable marker at a tip of the pointing implement within the image captured by the camera,
 wherein the processor is to detect a first calibration mark printed on the printed hypertext document, a second calibration mark printed on the printed hypertext document, and a third calibration mark printed on the printed hypertext document to determine a location, orientation, and scale of the printed hypertext document, where the first calibration mark, the second calibration mark, and the third calibration mark are identical to one another and form an L-shape with respect to an aspect ratio of the printed hypertext document.

17. The apparatus of claim 16, wherein the processor is to detect just a first calibration mark printed on the printed hypertext document and a second calibration mark printed on the printed hypertext document to determine a location, orientation, and scale of the printed hypertext document, where the first calibration mark is not identical to the second calibration mark.

18. A processor configured to process an image captured by a camera of a printed hypertext document and of a finger or other pointing implement within the field of view of the camera pointing to a region of the printed hypertext document, the processor holding in a memory pre-stored information concerning the content of the printed hypertext document and being configured to determine from the image and the pre-stored information the identity of a linked web page or a linked multi-media data file referred to on that hypertext document in the region pointed to, and to then fetch from the Internet or a local cache of web pages data that comprises the linked web page or linked multimedia data file referenced in the printed hypertext document, wherein the image is captured by the camera and includes the printed hypertext document and a pointer not part of the printed hypertext document, wherein the pointer points to a region of the printed hypertext document without writing on the printed hypertext document, wherein the processor is to determine the identity of the web page or the linked multi-media data file referred to on the hypertext document in the region pointed to by determining where the pointer points to within the image captured by the camera, wherein the pointer is one of a finger of a user and a pointing implement other than a finger of the user, wherein where the pointer is a finger of the user, the processor is to detect the finger of the user within the image captured by the camera responsive to the user performing a predetermined movement of the finger, and wherein where the pointer is a pointing implement, the processor is to detect the pointer by detecting a readily differentiated, locatable, and identifiable marker at a tip of the pointing implement within the image captured by the camera, wherein the processor is to detect a first calibration mark printed on the printed hypertext document, a second calibration mark printed on the printed hypertext document, and a third calibration mark printed on the printed hypertext document to determine a location, orientation, and scale of the printed hypertext document, where the first calibration mark, the second calibration mark, and the third calibration mark are identical to one another and form an L-shape with respect to an aspect ratio of the printed hypertext document.

19. The apparatus of claim 18, wherein the processor is to detect just a first calibration mark printed on the printed hypertext document and a second calibration mark printed on the printed hypertext document to determine a location, orientation, and scale of the printed hypertext document, where the first calibration mark is not identical to the second calibration mark.

20. A non-transitory computer-readable data storage medium storing a computer program for directing a processor to process an image captured by a camera of a printed hypertext document and of a finger or other pointing implement within the field of view of the camera pointing to a region of the printed hypertext document, to determine from the image and pre-stored information held in a memory the identity of a linked web page or a linked multi-media data file referred to on that hypertext document in the region pointed to, and to then fetch from the Internet or a local cache of web pages data that comprises the linked web page or linked multimedia data file referenced in the printed hypertext document, wherein the image is captured by the camera and includes the printed hypertext document and a pointer not part of the printed hypertext document, wherein the pointer points to a region of the printed hypertext document without writing on the printed hypertext document, wherein the processor is to determine the identity of the web page or the linked multi-media data file referred to on the hypertext document in the region pointed to by determining where the pointer points to within the image captured by the camera, wherein the pointer is one of a finger of a user and a pointing implement other than a finger of the user, wherein where the pointer is a finger of the user, the processor is to detect the finger of the user within the image captured by the camera responsive to the user performing a predetermined movement of the finger, and wherein where the pointer is a pointing implement, the processor is to detect the pointer by detecting a readily differentiated, locatable, and identifiable marker at a tip of the pointing implement within the image captured by the camera, wherein the processor is to detect a first calibration mark printed on the printed hypertext document, a second calibration mark printed on the printed hypertext document, and a third calibration mark printed on the printed hypertext document to determine a location, orientation, and scale of the printed hypertext document, where the first calibration mark, the second calibration mark, and the third calibration mark are identical to one another and form an L-shape with respect to an aspect ratio of the printed hypertext document.

21. The non-transitory computer-readable data storage medium of claim 20, wherein the processor is to detect just a first calibration mark printed on the printed hypertext document and a second calibration mark printed on the printed hypertext document to determine a location, orientation, and scale of the printed hypertext document, where the first calibration mark is not identical to the second calibration mark.

\* \* \* \* \*